(12) United States Patent
Tran

(10) Patent No.: US 7,920,074 B2
(45) Date of Patent: *Apr. 5, 2011

(54) APPARATUS AND METHOD FOR AN ACCELERATED THUMBWHEEL ON A COMMUNICATIONS DEVICE

(75) Inventor: Phat H. Tran, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1034 days.

This patent is subject to a terminal disclaimer.

(21) Appl. No.: 11/675,764

(22) Filed: Feb. 16, 2007

(65) Prior Publication Data

US 2007/0139224 A1 Jun. 21, 2007

Related U.S. Application Data

(63) Continuation of application No. 10/007,481, filed on Nov. 7, 2001, now Pat. No. 7,180,431.

(60) Provisional application No. 60/246,540, filed on Nov. 7, 2000.

(51) Int. Cl.
*H03M 11/00* (2006.01)

(52) U.S. Cl. ........... 341/20; 345/157; 345/684; 345/163

(58) Field of Classification Search .................... 341/20; 345/684, 157, 163
See application file for complete search history.

(56) References Cited

U.S. PATENT DOCUMENTS

| 5,179,648 A | 1/1993 | Hauck |
| 5,495,566 A | 2/1996 | Kwatinetz |
| 5,530,455 A | 6/1996 | Gillick et al. |
| 5,633,657 A | 5/1997 | Falcon |
| 6,304,746 B1 | 10/2001 | Fascenda et al. |

FOREIGN PATENT DOCUMENTS

WO  WO 98/26342  6/1998

*Primary Examiner* — Albert K Wong
(74) *Attorney, Agent, or Firm* — Jones Day; Krishna K. Pathiyal; Robert C. Liang

(57) ABSTRACT

An accelerated roller apparatus on a handheld electronic communications device that handles urgency conditions. The device includes a manipulable mechanism that is capable of generating a manipulation-related signal. Changes in the signal occur whenever motion is imparted upon the manipulable mechanism. An urgency activity detector module generates an urgency message when the changes in the signal indicate an urgency condition. The urgency activity detector module uses the signal changes to determine the urgency condition based upon timing of successive manipulations of the manipulable mechanism satisfying a preselected timing threshold. The urgency message is then used by an application operating on the device.

27 Claims, 6 Drawing Sheets

APPARATUS AND METHOD FOR AN ACCELERATED THUMBWHEEL ON A COMMUNICATIONS DEVICE

CROSS-REFERENCE TO RELATED APPLICATIONS

This application claims priority to and is a continuation of U.S. patent application Ser. No. 10/007,481 entitled "Apparatus and Method for an Accelerated Thumbwheel on a Communications Device," filed on Nov. 7, 2001, now U.S. Pat. No. 7,180,431 which claims priority to U.S. provisional application Ser. No. 60/246,540 entitled "Apparatus and Method for an Accelerated Thumbwheel on a Communications Device" filed Nov. 7, 2000. By this reference, the full disclosure, including the drawings, of U.S. patent application Ser. No. 10/007,481 and U.S. provisional application Ser. No. 60/246,540 are incorporated herein.

FIELD OF INVENTION

The invention relates to communications devices and more specifically to user interfaces for communications devices having a manipulable mechanism used for signalling and application messaging.

DESCRIPTION OF THE RELATED ART

Traditional thumbwheel or roller mechanisms operating on communications devices allow a user to signal a software application by a rotation upwards or downwards. For the class of rollers that relate to the invention, rotations are discrete or digital, with a signal caused by every click of the roller rotation. Traditionally, an interrupt service routine processes those click signals and in turn signals the user's intention by placing messages in a queue. Each message in the queue is sent to applications running on a device. Traditional roller messages signal that a rotation has occurred, and the direction of rotation. Some advanced roller messages also signal the amount of rotation.

FIG. 1 illustrates a typical interrupt service routine used with a roller mechanism in a communications device. With reference to FIG. 1, step 10 waits for roller activity to occur. This usually involves an interrupt service routine being triggered due to the rotation of the roller. At step 12 the roller position is incremented in the direction of the rotation of the roller, by a constant, which is proportional to the amount of roller rotation. Step 16 places the roll message into a queue, which is accessible to the communications device system software so that the message can be communicated to the currently running application.

Such a traditional roller implementation does not address the concern of detecting and signalling to a software application the degree of urgency with which a user imparts rotational motion upon the roller. The urgency may stem from a user's frustration that the wheel rotation is not causing an action in an application to occur fast enough. For instance, while traversing a particularly long list of contact names in an address book application, the roller rotation is used by the application to move a cursor, which in turn is used by the user in selecting a particular contact name in the list.

SUMMARY

The present invention overcomes at least some of the drawbacks of the previous approaches by providing a way for detecting the degree of urgency with which a user imparts a rotation onto a roller. The invention also provides a way for signalling the degree of urgency with which the user imparts motion onto a roller to an application. The detection of the degree of urgency in rotation includes keeping track of state information regarding the rotation of the roller and monitors changes in roller state information over time.

BRIEF DESCRIPTION OF THE DRAWINGS

In order that the invention may be more clearly understood, the preferred embodiment thereof will now be described in detail by way of example, with reference to the accompanying drawings, in which.

DETAILED DESCRIPTION OF EXAMPLES OF THE PRESENT INVENTION

Figure 1:
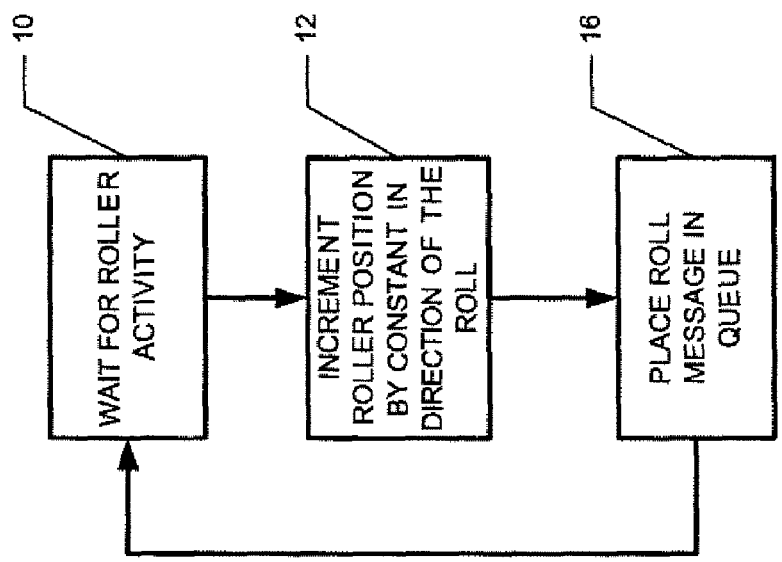
FIG. 1 is a flowchart of the prior art method for roller operations.
Figure 2:
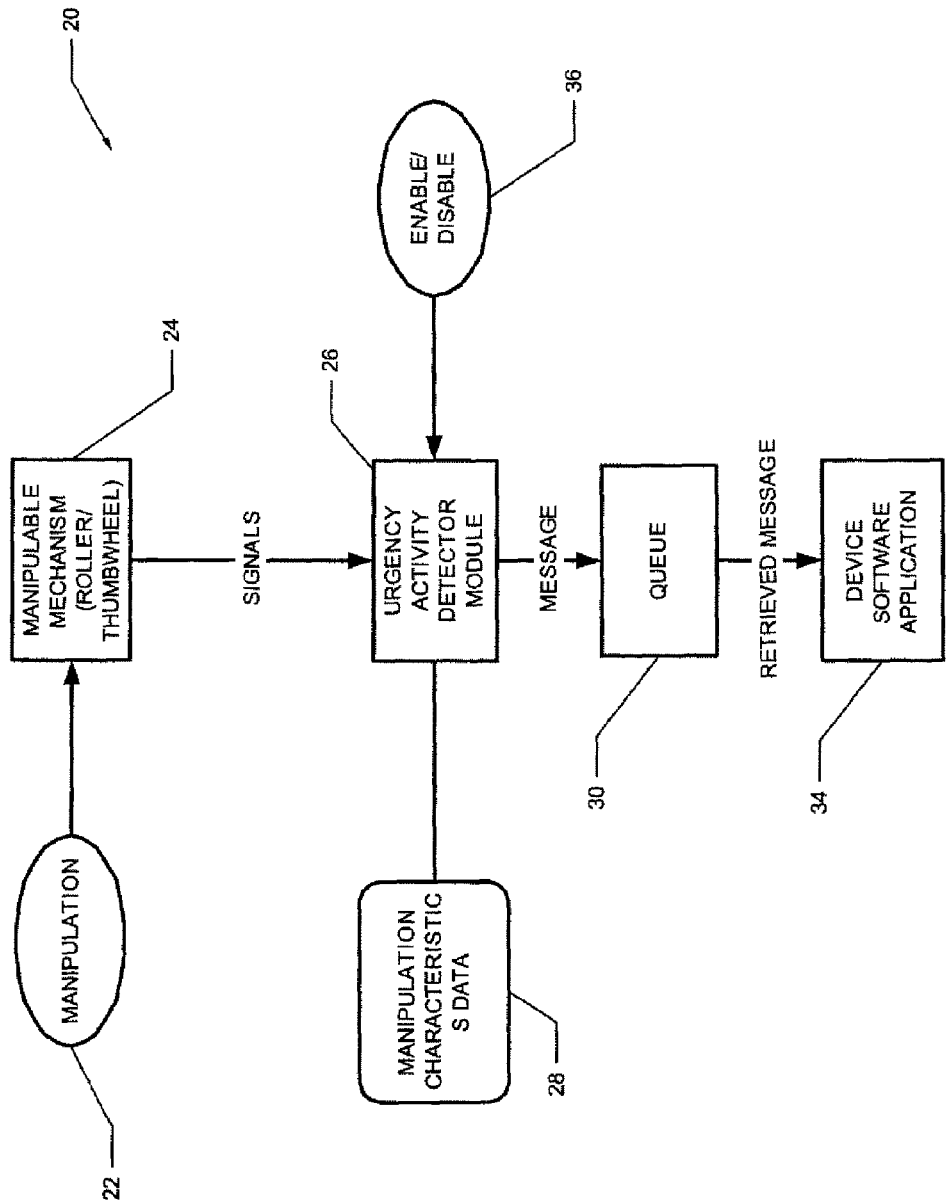
FIG. 2 is a block diagram depicting components used to process urgency activities.

FIG. 2 depicts components 20 used within a communications device to detect and process urgency conditions. The communications device includes a manipulable mechanism 24, such as a roller (which is also known as a thumbwheel). A user performs a manipulation 22 of the manipulable mechanism 24 in order to communicate with a software application 34 that is operating on the device. A user may create an urgency condition when the user imparts a multiplicity of consecutive strokes onto the roller.

When the manipulable mechanism 24 is a roller, the larger part of the roller is typically embedded within the device with only a small section of the roller protruding from the case of the device. The user has access to this small portion of the circumference of the roller at any one time. In the invention this mechanical constraint is turned into a resource to be exploited by the invention in a novel fashion. Given that the user cannot clasp the roller on opposing sides, the user is limited to stroking the protruding portion of the roller with a finger, usually the thumb. It should be noted that the device may be any such data communications device, such as a pager or a device that is equipped to receive both voice and non-voice data messages (e.g., cellular phone).

Manipulation 22 of the mechanism 24 results in signals being generated that are indicative of the direction, amount and other characteristics of the manipulation 22. An urgency activity detector module 26 uses such characteristics data 28 to detect and process an urgency activity/action. Upon detection, the urgency activity detector 26 generates a message that indicates whether an urgency activity has occurred. The message is placed in a queue 30 so that the software application 34 may retrieve and use it.

An enable/disable message 36 may be issued so that the communications device may turn on or off the urgency detection processing. If a disable message is issued, then the communications device operates in a manner consistent with a traditional method. In this manner, the present invention is capable of improved application signalling, while remaining backwards compatible with existing applications and roller hardware.

Figure 3:
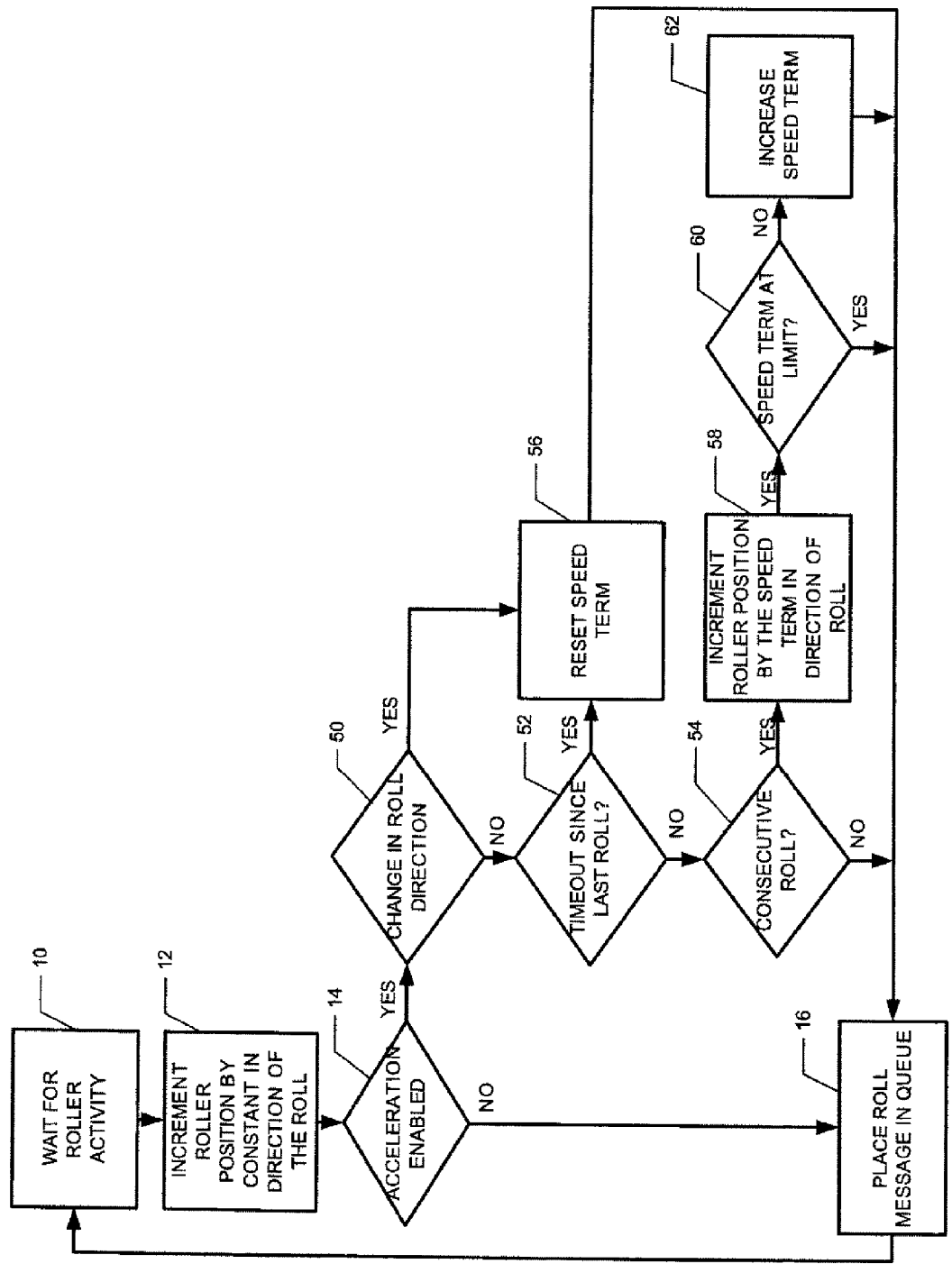
FIG. 3 is a flowchart depicting steps used to process urgency activities.

FIG. 3 depicts steps used to process urgency activities within the communications device. Step 10 waits for roller activity to occur. This usually involves an interrupt service routine being triggered due to the rotation of the roller. At step 12 the roller position is incremented in the direction of the rotation of the roller, by a constant, which is proportional to the amount of roller rotation. Decision block 14 examines whether the communications device has been enabled to detect urgency activities. If it is not enabled, then step 16 places the roll message into the queue, which is accessible to the currently running application.

However, if the urgency roller acceleration detection mode is enabled, then the device performs the following processing. Decision block 50 examines whether a change in roll direction has occurred. If a roll direction change has occurred, then the present invention interprets this as signifying the user's intention for instantaneous acceleration in the opposite direction of rotation, or rapid deceleration. When this condition is detected, processing continues at step 56. Step 56 resets the speed term before step 16 places the roll message in the queue. However, if a roll direction change has not occurred, then processing continues at decision block 52.

Figure 4:
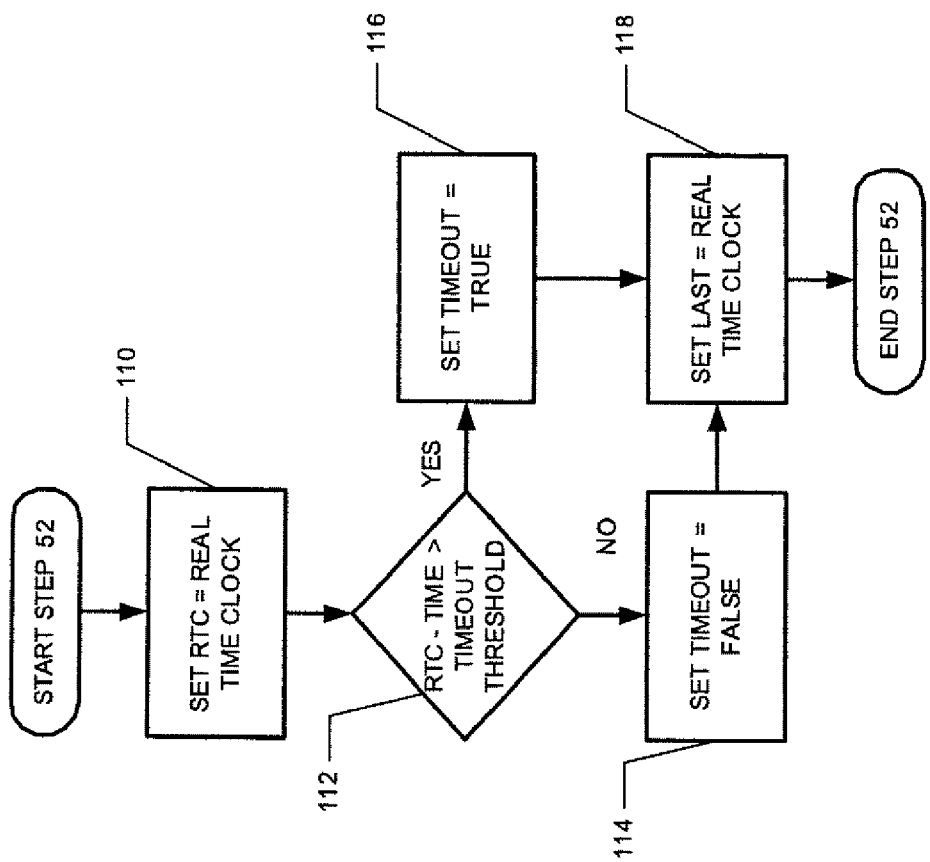
FIG. 4 is a flowchart depicting steps used to detect roller inactivity.

Decision block 52 examines whether a low degree of urgency in a roller operation has occurred. Decision block 52 detects a low rotation urgency by examining the timeout since the last roll. FIG. 4 shows in greater detail how a timeout is detected since the last roll.

With reference to FIG. 4, step 110 samples the value of the device's real time clock as "rtc". At decision block 112, the value of rtc is compared to the time value of the last roller rotation event, relative to a timeout threshold. In the event that the time lapsed between any two consecutive roll events is greater than the timeout threshold, a false timeout condition is signaled at step 114. Conversely, if the time lapsed between any two consecutive roll events is less than the timeout threshold, a true timeout condition is signaled at step 116. Finally, the value of the real time clock is sampled as 'time' in step 118 for future use in determining whether a timeout has occurred since this roll. It was found experimentally that the value of 50 ms was adequate for the value of timeout threshold.

In the event that the invention has detected a low degree of rotation urgency, a zero speed accelerated rotation message is generated, which is equivalent to a non-accelerated message. With reference back to FIG. 3, this is accomplished at step 56 by resetting the speed term. The zero speed accelerated rotation message is placed in the queue at step 16. After step 16 executes, then processing continues at step 10 which waits for roller activity.

Figure 5:
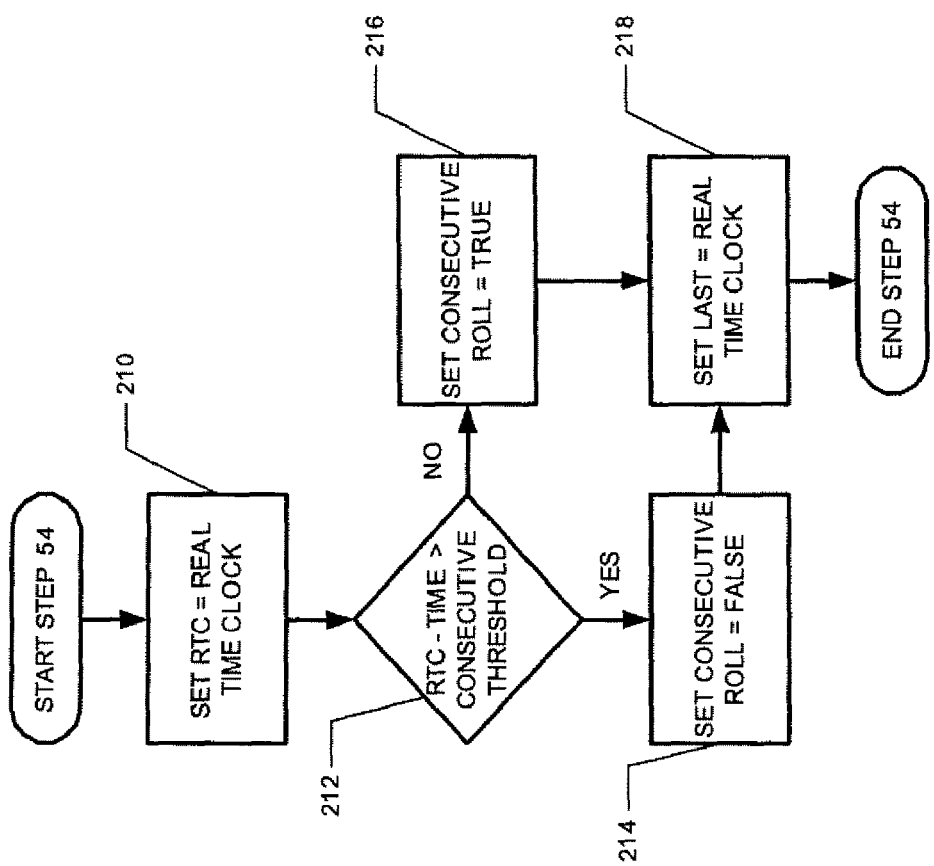
FIG. 5 is a flowchart depicting steps used to detect consecutive strokes of a roller.

If decision block 52 determines that a timeout has not occurred since the last roll, then processing continues at step 54. Step 54 aims to detect a high rotation urgency by detecting a consecutive roll. As used in this description, the term "rotation urgency" is the inverse function of the time lapsed between two consecutive roller strokes, measured in Hertz. Using appropriate thresholds for the time lapse, it is possible to define rotation urgency according to various degrees. For example, high and low rotation urgency could have corresponding low and high time-lapse thresholds, respectively. FIG. 5 shows in greater detail how a consecutive roll is detected.

With reference to FIG. 5, step 210 samples the value of the real time clock as "rtc". At step 212, the value of rtc is compared to the time value of the last roller rotation event, relative to a consecutive threshold. In the event that the time lapsed between any two consecutive roll events is greater than the consecutive threshold, a false consecutive roll condition is signaled at step 214. Conversely, if the time lapsed between any two consecutive roll events is smaller than the consecutive threshold, a true consecutive roll condition is signaled at step 216. Finally, the value of the real time clock is sampled as 'time' in step 218 for future use in determining whether the next roll is consecutive. It was found experimentally that the value of 350 ms was adequate for the value of consecutive threshold. Processing continues back at FIG. 3.

With reference to FIG. 3, in the event that the decision block 54 has detected a high degree of rotation urgency, an accelerated rotation message is generated. Step 58 increments the roller position by the speed term in the direction of the roll. Decision block 60 examines whether the speed term is at its limit. If it is at its limit, then step 16 places the roll message in the queue. However if the speed term has not yet reached its limit, then step 62 increases the speed term before step 16 places the roll message in the queue.

It should be noted that detecting high and low degrees of rotation urgency and generating accelerated rotation messages may have a combined effect of providing a form of electronic inertia during urgent rotation, whereby it appears to the user that a roller which has mechanically stopped rotating in between strokes continues to cause rotation signalling to occur in the form of accelerated rotation messages. These messages convey an upper bounded rotation amount that is proportional to rotation urgency. The term "electronic rotation inertia" is rotation signalling which continues to occur after the mechanical rotation which initially caused the signalling has stopped. Also, it should be noted that a further refinement is accomplished by providing a way of rapid rotation deceleration, which is another type of accelerated rotation message.

It will be appreciated that the above description relates to the preferred embodiment by way of example only. Many variations on the invention will be obvious to those knowledgeable in the field, and such obvious variations are within the scope of the invention as described and claimed, whether or not expressly described. For example, FIG. 6 depicts one such variation of the present invention.

Figure 6:
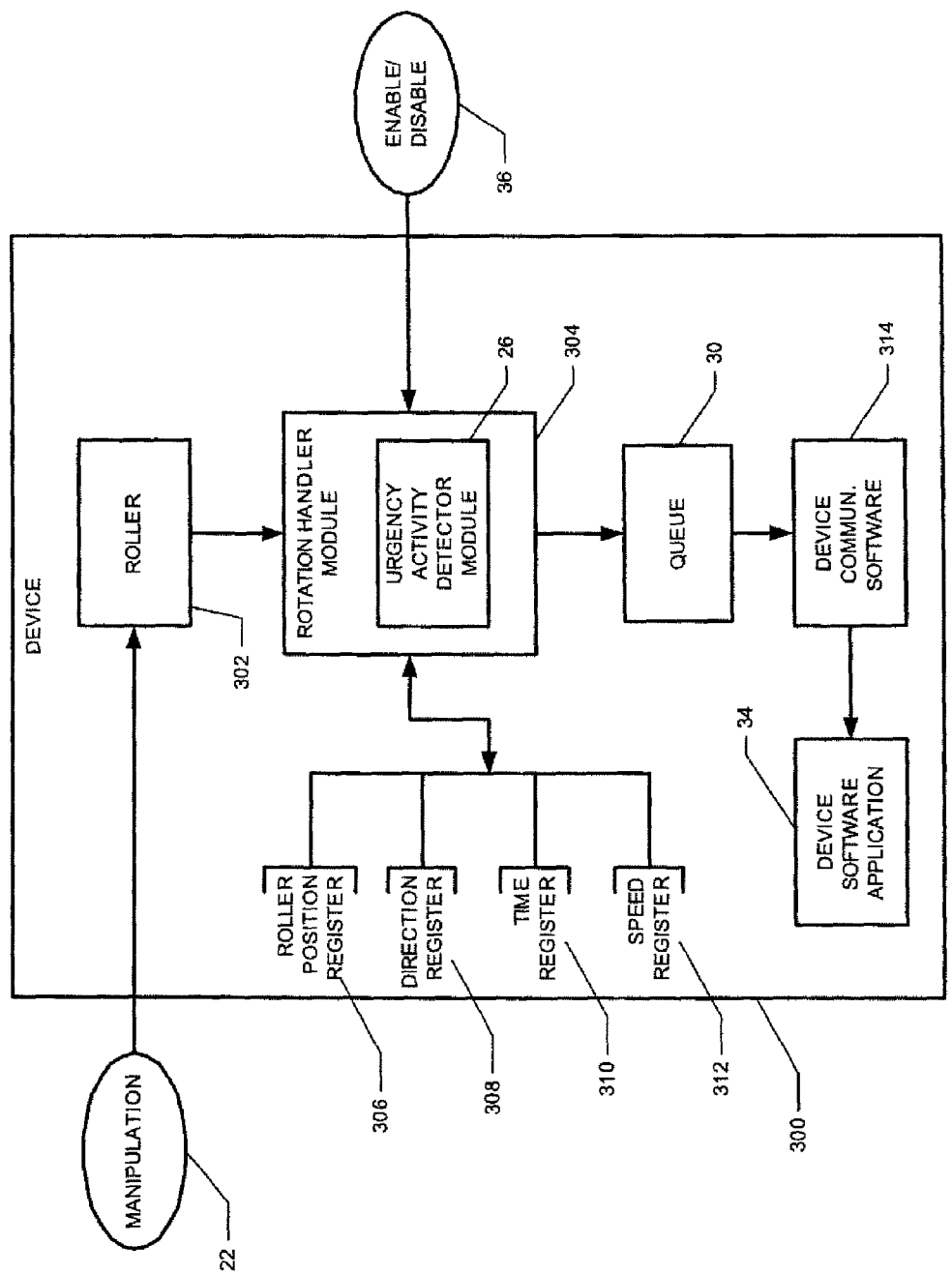
FIG. 6 is a block diagram depicting components used to process urgency activities within an exemplary communications device.

FIG. 6 shows an exemplary use of the present invention on a handheld electronic communications device 300. Manipulation 22 of roller 302 generates a roller input signal. The roller input signal includes a roller rotation direction which can be either positive or negative and a roller rotation amount. An accelerated mode input 36 is received which can be either active or inactive. When the mode is inactive, then present invention is disabled and the rotation handler module 304 handles manipulation signals in accordance with traditional roller approaches.

Roller state is computed by the following steps. If the roller input rotation direction is positive, then the roller position stored in register 306 is incremented by a constant amount proportional to the roller rotation amount. If the roller input rotation direction is negative, then the roller position stored in the register 306 is decremented by a constant amount proportional to the roller rotation amount.

If the accelerated mode input is active, then the roller state data is stored in the following registers: the value of the roller rotation direction is stored in the direction register 308; the value of a real time clock is stored in the time register 310; and the instantaneous differential amount of roller acceleration is stored in the speed register 312.

The roller rotation direction is compared to the value stored in the direction register 308. If the roller rotation direction is different than the value stored in the direction register 308, a change in roller direction condition is detected. If the change in roller direction condition is detected, then the speed register 312 is reset to zero. The lapsed time is computed by subtracting the value of the time register from the value of the real time clock. If the time lapsed is greater than a timeout threshold, a timeout condition is detected. If the timeout condition is detected, the speed register 312 is reset to zero. If the time lapsed is smaller than a consecutive threshold, a consecutive roll condition is detected.

If the consecutive roll condition is detected, then the following steps are performed. If the roller rotation direction is positive, then the roller position register 306 is incremented by the amount of the speed register 312. If the roller rotation direction is negative, then the roller position register 306 is decremented by the amount of the speed register 312. If the speed register 312 is less than a predetermined limit, then the value of the speed register 312 is incremented by an acceleration amount. The value of the roller rotation direction is stored in the direction register 308. The value of the real time clock is stored in the time register 310. The change in the roller state is placed as a roll message into the queue 30, which is accessible to the communications device system software 314 so that the message can be communicated to the currently running application 34.

It is claimed:

1. An apparatus on a handheld electronic device that handles urgency conditions comprising:
    a manipulable mechanism capable of providing a manipulation-related signal, changes in the signal occurring whenever motion is imparted upon the manipulable mechanism; and
    an urgency activity detector module that generates an urgency message when the changes in the signal indicate an urgency condition,
    said urgency activity detector module using the signal changes to determine the urgency condition based upon timing of successive manipulations of the manipulable mechanism satisfying a preselected timing threshold;
    wherein an application operable on the device processes the urgency message.

2. The apparatus of claim 1 wherein the manipulable mechanism is a roller.

3. The apparatus of claim 2 wherein a signal is generated by every click of the roller's rotation.

4. The apparatus of claim 2 wherein a first and second level of urgency is detected by the urgency activity detector module, said first level of urgency being determined when the timing of successive manipulations satisfy a first preselected timing threshold, said second level of urgency being determined when the timing of successive manipulations satisfy a second preselected timing threshold.

5. The apparatus of claim 4 wherein the second level of urgency indicates greater urgency relative to the first level of urgency;
    wherein, for the first level of urgency, the urgency activity detector module is configured to process the first level of urgency by incrementing roller position by a constant in direction of the roll;
    wherein, for the second level of urgency, the urgency activity detector module is configured to use a speed term to increase the rate at which a message is viewed beyond rate determined by the constant, thereby resulting in an acceleration in the viewing of the message.

6. The apparatus of claim 5 wherein the second preselected timing threshold is representative of timing between successive manipulations being less than the timing between successive manipulations for the first preselected timing threshold.

7. The apparatus of claim 2 wherein the roller is embedded within the device with a small section of the roller protruding from the device.

8. The apparatus of claim 1 wherein the manipulation of the mechanism results in signals being generated that are indicative of the direction and amount of the manipulation, said urgency activity detector module using the generated signals to determine the urgency condition.

9. The apparatus of claim 1 further comprising:
    a queue connected to the urgency activity detector module that stores the urgency messages.

10. The apparatus of claim 1 wherein the urgency message in the queue is provided to the application.

11. The apparatus of claim 1 wherein a mode message indicates whether the urgency activity detector module is to process urgency conditions.

12. The apparatus of claim 1 wherein the urgency message is a disable message to indicate that the manipulations of the mechanism are to be provided to the application without an urgency indication.

13. The apparatus of claim 1 wherein a non-urgent message is generated from the manipulation of the mechanism when the manipulation does not indicate an urgency condition.

14. The apparatus of claim 1 wherein the urgency activity detector module generates a rapid rotation deceleration message when the timing of successive manipulations of the mechanism satisfies a preselected rapid deceleration timing threshold.

15. The apparatus of claim 1 wherein the device is a pager.

16. The apparatus of claim 1 wherein the device is equipped to receive both voice and non-voice data messages.

17. The apparatus of claim 1 wherein the urgency activity detector module detects that rotation urgency is of a preselected low degree to disable electronic rotation inertia, and upon the detection of the sufficiently low degree of rotation urgency, the amount of electronic rotation associated with the signal is set to the amount of mechanical rotation associated with the roller signal.

18. A method for roller input on a handheld electronic device comprising the steps of:
    (a) receiving roller input;
    (b) receiving an accelerated mode input which can be either active or inactive;
    (c) computing a roller state;
    (d) if the accelerated mode input is active, then accelerated mode steps instructions are enabled in order to detect an urgency condition, said accelerated mode instructions comprising comparing timing of successive manipulations of the roller to a preselected timing threshold; and
    (e) signaling a change in the roller state to software executing on the handheld electronic device that is indicative of an urgency condition if the accelerated mode input is active.

19. The method of claim 18 in which the roller input of step (a) comprises:
    a roller rotation direction which can be either positive or negative; and
    a roller rotation amount.

20. The method of claim 19 in which the step of computing the roller state of step (c) comprises a roller position register whereby:
    if the roller input rotation direction is positive, the roller position register is incremented by a constant amount proportional to the roller rotation amount; and if the roller input rotation direction is negative, the roller position register is decremented by a constant amount proportional to the roller rotation amount.

21. The method of claim 20 in which the accelerated mode instructions in step (d) comprise:
   computing an accelerated roller state;
   detecting a change in direction;
   detecting a timeout condition;
   detecting a consecutive roll condition; and
   computing a value for the roller position register as a function of the accelerated roller state and detected conditions.

22. The method of claim 21 in which the accelerated roller state of step (d) comprises a direction register, a time register, and a speed register whereby:
   the value of the roller rotation direction is stored in the direction register;
   the value of a real time clock is stored in the time register; and
   the instantaneous differential amount of roller acceleration is stored in the speed register.

23. The method of claim 22 in which the step of detecting a change in roller direction comprises a step of comparing roller rotation direction to the value stored in the direction register.

24. The method of claim 22 in which the step of computing an accelerated roller state comprises a step of computing a time lapsed by subtracting the value of the time register from the value of the real time clock.

25. The method of claim 24 in which the step of detecting a timeout condition comprises the step of comparing the time lapsed to a timeout threshold whereby if the time lapsed is greater than the timeout threshold, a timeout condition is detected.

26. The method of claim 24 in which the step of detecting a consecutive roll condition comprises the step of comparing the time lapsed to a consecutive threshold whereby if the time lapsed is smaller than the consecutive threshold, a consecutive roll condition is detected which is indicative of the urgency condition.

27. The apparatus of claim 1, wherein the apparatus comprises an accelerated roller apparatus.

* * * * *

UNITED STATES PATENT AND TRADEMARK OFFICE
CERTIFICATE OF CORRECTION

PATENT NO. : 7,920,074 B2  
APPLICATION NO. : 11/675764  
DATED : April 5, 2011  
INVENTOR(S) : Phat H. Tran Page 1 of 1

It is certified that error appears in the above-identified patent and that said Letters Patent is hereby corrected as shown below:

In Column 6, Line 49, the word "steps" should be removed.

Signed and Sealed this
Sixth Day of September, 2011

David J. Kappos
*Director of the United States Patent and Trademark Office*